Jan. 9, 1951   N. H. CARGILE ET AL   2,537,735
COMBUSTION POT AND MIXING CHAMBER
Filed Nov. 27, 1941   3 Sheets-Sheet 3

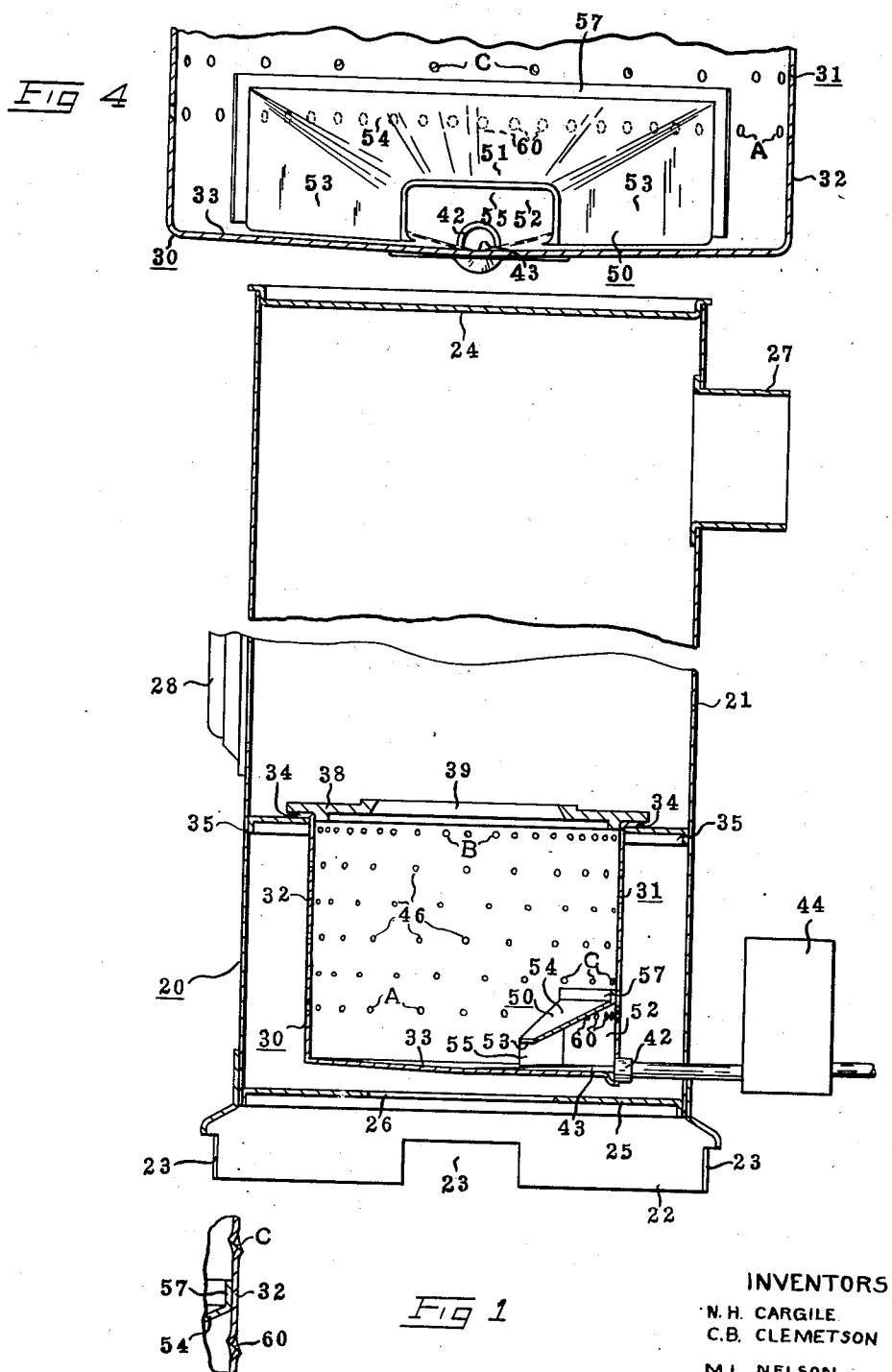

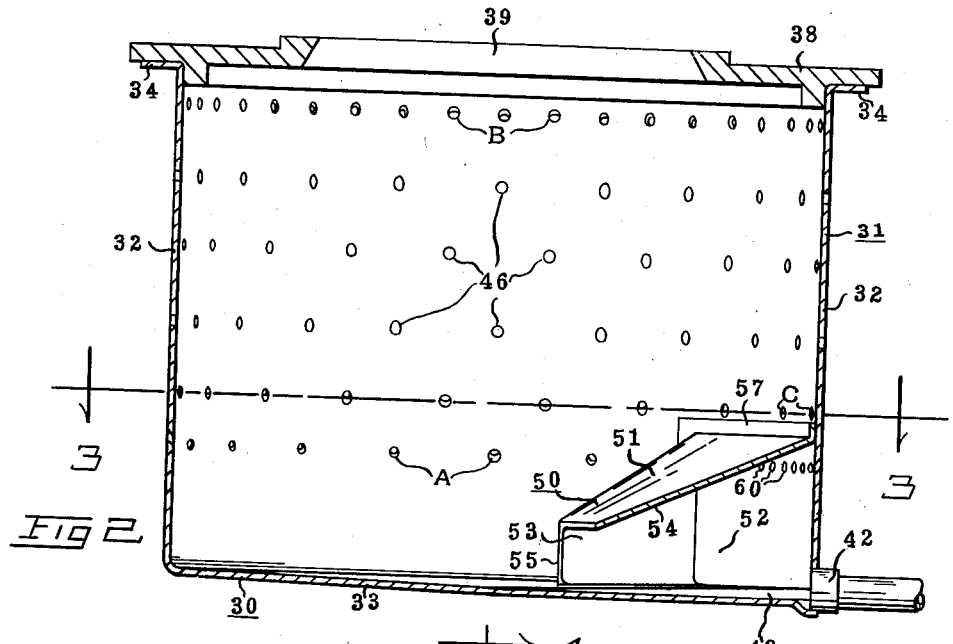
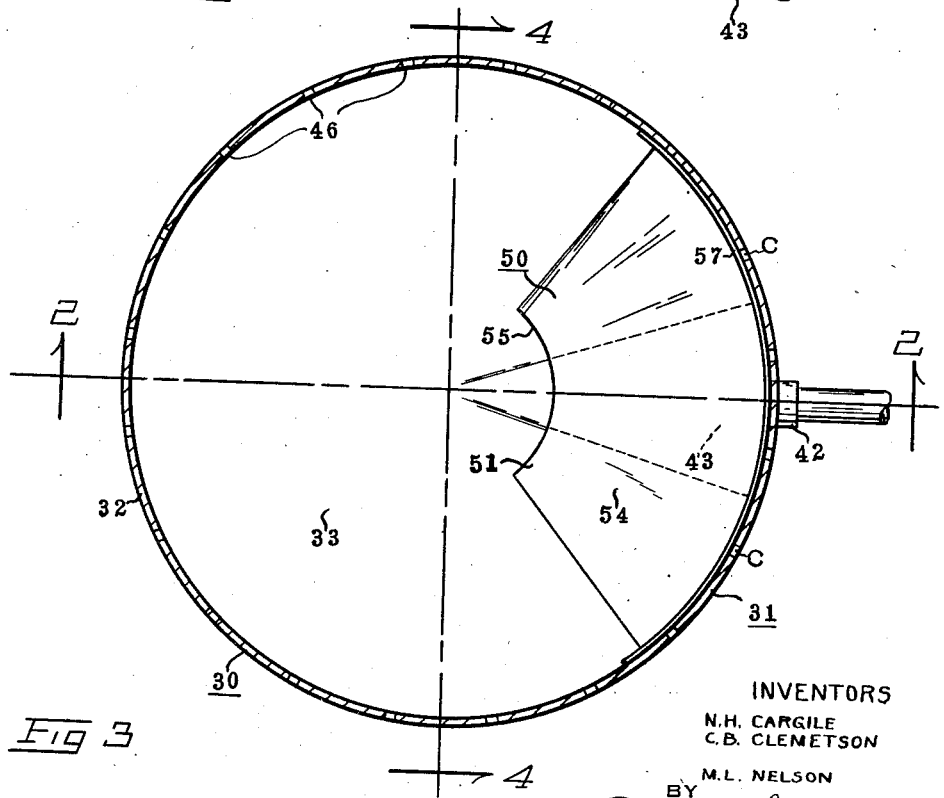

INVENTORS
N.H. CARGILE
C.B. CLEMETSON
M.L. NELSON
BY
Warren W. F. Schmieding
ATTORNEY Patented Jan. 9, 1951

2,537,735

UNITED STATES PATENT OFFICE 2,537,735

COMBUSTION POT AND MIXING CHAMBER

Neil H. Cargile, Cornelius B. Clemetson, and Marcus L. Nelson, Nashville, Tenn., assignors, by mesne assignments, to Allen Manufacturing Company, Inc., Nashville, Tenn., a corporation of Tennessee Application November 27, 1941, Serial No. 420,698

12 Claims. (Cl. 158—91)

The present invention relates to fuel burners, and more particularly to a liquid fuel or oil burner of the type in which oil is fed to the bottom of a combustion pot and there vaporized, and in which the vapors or gases rise upwardly and are intermixed with air and then burned.

An object of the present invention is to form a mixing chamber, and to supply air and oil to the same in such manner that a relatively small, steady burning pilot flame can be maintained.

Another object of the invention is to provide a mixing chamber adjacent the bottom of the combustion pot of an oil burner, which mixing chamber is supplied with air and fuel for maintaining a small flame which not only functions as a pilot, but also is so disposed and directed as to maintain the bottom wall of the combustion pot at fuel vaporizing temperature.

Another object of the invention is to provide a mixing chamber of such form that it covers only a relatively small area of the bottom wall of the combustion pot whereby a relatively large area of the bottom wall of the combustion pot and the oil thereon are exposed directly to radiant heat during operation of the burner.

In carrying out the above objects, it is a further object of the present invention to provide an improved method of and apparatus for causing the air, and fuel mixture, which passes over the liquid fuel in the mixing chamber, to be gradually increased in velocity as it approaches the outlet of the mixing chamber.

A still further object is to provide for the ready conduction of heat from the metal wall of the mixing chamber to the air and fuel mixture passing therethrough and to the liquid fuel within the chamber.

Further objects and advantages will be apparent from the following description, reference being had to the accompanying drawings wherein preferred forms of embodiments of the present invention are clearly shown.

In the drawings:

Fig. 1 is a fragmentary view, partly in section, of a space heater embodying our invention;

Fig. 2 is a view in section, and on a larger scale, of a fuel burner incorporated in the space heater shown in Fig. 1, the view being taken substantially on line 2—2 of Fig. 3;

Fig. 3 is a view in section taken on line 3—3 of Fig. 2;

Fig. 4 is a fragmentary view in section, the section being taken on line 4—4 of Fig. 3;

Fig. 5 is a fragmentary view, in section, showing a portion of a wall of the fuel burner;

Figure 6:
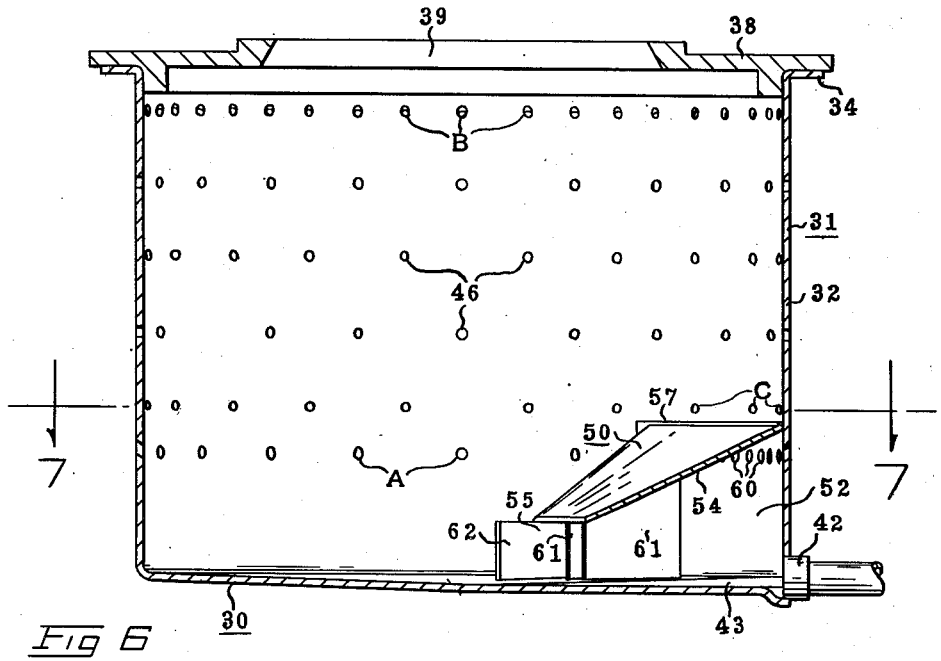
Fig. 6 is a view in section of a fuel burner showing another embodiment of a pilot flame burner; and, Fig. 7 is a view in section taken on line 7—7 of Fig. 6.

Referring to the drawings, for the purposes of illustrating one form of the invention, we have shown a space heater indicated generally at 20. In this particular embodiment of the invention, the space heater is shown comprising a cylindrical sheet metal casing 21 mounted on a ring like base 22. The base is provided with openings 23 for admitting air underneath the casing 21. The casing is closed at the top by a wall 24 and at the bottom there is provided a wall 25, having a central opening 26 for admitting air to the casing. A flue pipe 27 is provided at the rear of the casing, and a door 28 is provided at the front of the casing through which access may be had to the interior thereof. A fuel burner 30 is disposed within the casing.

The fuel burner 30 comprises a combustion pot 31 having cylindrical side walls 32 and a slightly concaved bottom wall 33. This pot can be formed of either sheet metal or metal casting. The combustion pot is supported in the casing by a laterally extending flange 34 formed about the top of the combustion pot, which flange rests on the upper surface of a ring 35 that is secured to the side walls of the casing. A burner plate 36 rests on the top of the pot 31 and this plate has a central opening 39.

Fuel oil is supplied to the bottom wall of the combustion pot through a pipe 42, which pipe extends through an opening in the side wall of the pot and adjacent the bottom wall. A portion 43 of the bottom wall of the pot, adjacent the outlet of the pipe 42, is depressed to form a spreading area for the oil. Oil upon entering the pot spreads over this area in a thin layer. The flow of fuel to the combustion pot is controlled by a valve mechanism indicated generally at 44. This valve mechanism is shown diagrammatically, but is of any suitable construction which will meter the flow of oil to the combustion pot.

The side walls 32 of the combustion pot are provided with a plurality of air inlet ports 46. In some burners, the lowermost ports need not be tipped downwardly, but in the embodiment shown, these ports indicated at A are tipped downwardly for directing streams of air inwardly radially and toward the bottom wall of the pot. Also, in some burners, the uppermost ports need not be tipped but in the embodiment illustrated these uppermost row of ports indicated at B are directed inwardly radially and upwardly toward the opening 39 in the plate 38. If the combustion pot is formed of sheet metal, all tipped ports can be formed by piercing the walls, and then bending the metal about the holes; such holes are shown in Fig. 5.

The combustion pot 31, as described thus far, except for the depressed portion 43, is similar to the so called "Breese" type of hydrocarbon burner, in which fuel oil is supplied to the bottom wall of the pot where it is vaporized and the rising vapors are intermixed with air entering the side walls of the pot and burned. When the maximum quantity of fuel is fed to the burner, the flame burns out of the top outlet 39 of the pot, the secondary air being supplied by the upper holes in the pot. The bottom wall of the pot is heated initially by burning the fuel on the bottom wall and thereafter the flame rises in the pot and the fuel burns at varying levels depending upon the quantity of fuel being delivered to the burner. The bottom wall and fuel supplied thereto is heated by radiant heat.

It is desirable to maintain a pilot flame within the combustion pot 31 so that when it is desired to render the heater effective, it is necessary only to increase the flow of oil to the burner. This could be accomplished by controlling the valve mechanism 44 by a device responsive to the temperature in the space to be heated by the heater.

We have provided a novel pilot burner indicated generally at 50 for maintaining a relatively small, soot-free flame adjacent the bottom wall of the combustion pot. The pilot burner comprises an inverted channel shaped member in the form of a hood 51, which cooperates with the side and bottom walls of the combustion pot to form a fuel mixing chamber 52. Preferably, the hood 51 is formed of cast iron and has two side walls 53 and a top wall 54 interconnecting the side walls. The side walls 53 and the top wall converge toward one end of the chamber 52 and the edges of the side and top walls form an outlet 55. The opposite end edge of the top wall 54 of the hood 51 is arcuate, the arc having substantially the same curvature as the side wall of the combustion pot. A flange 57 is formed along the arcuate edge of the wall 54 and this flange and the end edges of the side walls 53 of the hood 51 engage the side wall of the combustion pot. The lower edges of the side walls 53 of the hood 51 engage the bottom wall of the combustion pot. The chamber 52 overlies substantially the entire depression 43 so that substantially all oil within this depression is confined within the mixing chamber. Preferably, the hood 51 extends toward the center of the bottom wall of the combustion pot. Thus, the mixing chamber 52 is formed by the walls of the inverted channel shaped hood 51, a portion of the side wall of the combustion pot and the bottom wall of the pot and the cross sectional area of the chamber gradually diminishes toward the outlet thereof.

The portion of the side wall 32 of the combustion pot forming one end of the chamber 52 is provided with a plurality of air inlet ports 60. These ports are tipped downwardly for directing streams of air downwardly toward the outlet 55 and in paths converging toward the outlet 55. Since the streams of air entering the chamber are directed inwardly and downwardly and since the side walls and top and bottom walls converge, eddy currents cannot be created as would be the case if the air were to strike the walls of the pilot obliquely. Also the hood 51 is formed so that the longitudinal junctions of the walls of the chamber 52 are rounded for preventing eddies of air in the chamber.

It is desirable to form the outlet end of the top wall 54 of the hood 51 concaved as is clearly shown in Fig. 3. Also, it is desirable that the outlet end of the hood 55 be of uniform height.

We have found that where the diameter of the combustion pot is ten inches, the length of the arcuate end of the chamber 52 is, preferably nine inches and the height two and five-sixteenths inches. The ports 60 are preferably formed by a number forty-two or forty-four drill and are spaced approximately nine-sixteenths to one-half inch apart and are located five-sixteenths of an inch below the under side of the top wall 54 of the chamber. The outlet 55 is preferably two and one-half inches wide and fifteen-sixteenths of an inch in height.

A row of ports C is formed in the side wall of the combustion pot immediately above the edge of the top wall 54 of the pilot and these ports are tipped downwardly and radially inwardly for directing air streams downwardly along the top wall 54 of hood 51 to the outlet 55.

We prefer to secure the hood 51 in position inside the combustion pot so that it can be readily removed and replaced so that access can be had to the oil inlet for cleaning, if necessary. The securing device can be of any suitable design and it is not shown.

In operation, when the burner is first started, fuel is admitted to the bottom wall of the combustion pot through the pipe 42 and it is ignited by dropping a match or other flaming object into the pot through the door 28. At first the fuel burns on the bottom wall of the combustion pot but as the temperature at the bottom wall increases, vaporization of the fuel increases and the flame rises in the pot and burns at varying levels, the levels of the burning depending on the quantity of fuel delivered to the pot. The radiant heat from the flame vaporizes the fuel on the bottom wall 33 and also heats the hood 51.

When it is desirable to reduce the pilot flame, the valve mechanism 44 is adjusted to reduce the flow of fuel to the burner to less than two or three cubic centimeters per minute, for example. The reduction in fuel supply causes the flame to descend into the combustion pot where it is maintained by the pilot.

This pilot flame will be relatively small and steady. Combustion of fuel starts underneath the hood and the flame projects from the outlet 55 and slightly upwardly over the bottom wall of the combustion pot. It has no tendency to "lick back" into the mixing chamber. This extremely clean and steady flame is assured by forming the mixing chamber and directing air into the same so that the velocity of the air and gases, particularly the air and gases passing toward and over the flame and the oil thereblow, are gradually increased as they approach the outlet 55. The bottom of the depression 43 is preferably on a horizontal plane and is tapered toward the center of the pot. Oil entering the pot is spread in a thin layer and flows within the depression toward the center of the pot. Thus the oil presents a relatively large surface subjected to heat and air and is therefore readily vaporized. The secondary air for completing combustion of the fuel is directed so that it is supplied where complete combustion is to take place, namely, at the outlet 55 of the mixing chamber. This air is supplied by the streams flowing from the ports C which are directed downwardly along the top wall 54 of the pilot and also by air flowing from the ports A. Thus, ample secondary air is provided at the outlet 55 to complete combustion and maintains the flame spread over the center of the bottom of the pot. The pilot flame does not "lick back" into or over the top wall of the mixing chamber 52. In actual practice, if any carbon is deposited while the burner is operating on pilot flame, such carbon is dissipated on the succeeding high flame operation.

We have found that by using the improved mixing chamber, the pilot flame can be maintained with a minimum consumption of fuel. For example, pilot burners now on the market for use with like or similar fuel burners require 40% to 50% more fuel than that herein disclosed. The present invention, therefore, in this respect has the dual advantage of saving fuel and does not generate an appreciable amount of heat, by the pilot flame, when heating is not demanded.

Since, by the improved mixing chamber, a steady flame can be maintained, the small flame can be directed where it is most useful, namely, onto the bottom of the pot. Since the bottom of the pot can be maintained above oil vaporizing temperature, all oil delivered into the pot, including the increased quantity delivered thereto upon increased demand for heat, is quickly vaporized. In this manner the transition from pilot flame to higher fires takes place quickly without the puddling of the oil on the bottom of the burner, which puddling usually causes an objectionable smoky flame.

We have found that this type of pilot burner operates satisfactorily with either the light or heavy oils under varying high and low draft conditions. This is partly attributed to the fact that the pilot flame is close to the bottom wall of the combustion pot and therefore maintains the same above heavy oil vaporizing temperature and is partly attributed to the fact that the velocity of the air and other gases in the mixing chamber gradually increase toward the outlet thereof.

It is highly desirable to cause substantially complete vaporization of all fuel within the mixing chamber when it is functioning as a pilot burner. If, when operating on pilot flame, liquid fuel is permitted to escape from the mixing chamber, it will burn slowly and create undesirable smoke and soot. The mixing chamber herein shown is of sufficient width to overlie substantially all of the liquid fuel for pilot light purpose although heavy oil is being used, and, it is to be understood that it can be of smaller dimensions if light fuel is being used.

It is highly desirable also to subject the fuel on the bottom of the pot to as much radiant heat as possible when the burner is operating on higher flame so that heavy fuel is vaporized quickly.

Since by constructing the mixing chamber 51 as herein disclosed, a relatively small pilot light can be maintained which consumes only a small amount of oil and which, consequently requires vaporization only of a small amount of liquid fuel. Therefore, the mixing chamber can be relatively narrow and manifestly a relatively large portion of the bottom wall and the oil thereon are directly exposed to radiant heat, when the burner is at higher burning rates. Moreover, since the hood 51 is disposed close to the bottom of the combustion pot and to the oil therebelow, and, since the entire top wall of the hood is exposed to and heated by radiant heat, heat is readily transferred from said top to the oil therebelow for assisting materially in vaporizing the fuel. Consequently, by utilizing the improved mixing chamber, the burner can readily vaporize and consume larger quantities of the heavier oils than burners of like dimensions.

Figure 7:
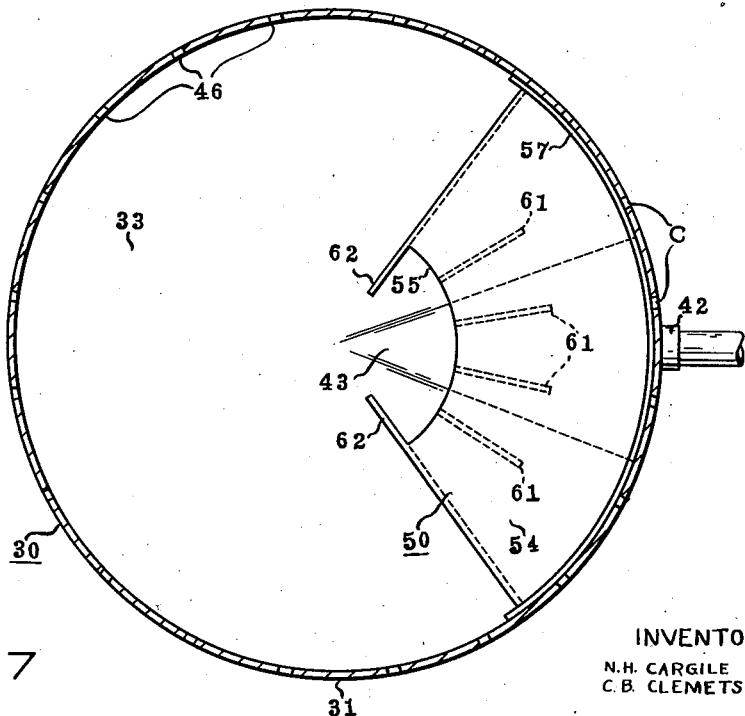

In the larger type burner, for example one in which the diameter of the combustion pot is twelve or thirteen inches, it has been found advantageous to extend metallic fins or vanes 61 from a wall of the hood 51. Such structure is illustrated in Figs. 6 and 7. The lower edges of the vanes are spaced from the bottom wall of the combustion pot, slightly.

In these larger type burners using a wider pilot, when no vanes 61 are employed, the flame below the hood tends to burn unevenly, migrating from one side to the other and thereby varying the rate of vaporization of the oil; the consequent effect of which is a tendency to assume a smoky type flame. We have found that the vanes assist in directing the flow through the chamber, prevent disturbing air currents from entering the outlet of the mixing chamber, cause an increase in velocity of the mixture because they reduce the cross sectional area of the chamber, and conduct heat from the walls of the chamber into the fuel mixture and conduct heat to the oil on the bottom wall. The fire underneath the hood is separated into a plurality of separate flames, causing uniform vaporization throughout the entire width of the mixing chamber and the consequent effect of a uniform flame throughout the width of the outlet and of the mixing chamber.

We have also found that, on larger type burners, it is advantageous to form vertically extending shields 62 at the outlet of the mixing chamber. These shields are formed by extending the side walls 53 of the hood. These shields aided in preventing disturbing air currents from entering the outlet end of the mixing chamber 52. Also, we have found that due to the larger radiating surface of the bottom wall of the larger type burner it is desirable to concentrate the heat of the pilot adjacent the outlet of the mixing chamber. The shields 62 aid in accomplishing this. The pilot flame is therefore concentrated over that part of the bottom of the pot which is first to receive oil flowing from the mixing chamber. Thus, when the oil flow to the pot is increased, the oil is vaporized substantially immediately with the consequent effect of eliminating objectionable smoking.

Although, we have illustrated the present invention in connection with a natural draft heating system, we have found that the same is applicable to a system in which air, for combustion purpose, is forced through the burner and that all advantages herein disclosed are present in the forced air system.

While the forms of embodiments of the present invention as herein disclosed constitute preferred forms, it is to be understood that other forms might be adopted, all coming within the scope of the claims which follow.

We claim:

1. In a fuel burning device, a combustion pot including side and bottom walls, means forming a mixing chamber including two side walls extending from a side wall of the combustion pot inwardly and along the bottom wall, the inner end portions of said side walls converging, the lower edges of said side walls engaging with the bottom wall of the pot, and a top wall extending from said side wall of the combustion pot, the inner end portion of said top wall sloping downwardly and connecting the side walls, said mixing chamber having an outlet opening at said inner end thereof; means for supplying fuel to the bottom wall within the mixing chamber, the side wall of the pot being provided with an opening for flow of air into the chamber.

2. A fuel burning device comprising in combination, a combustion pot including bottom and substantially vertical side walls, said walls having vertically spaced perforations for admitting air for combustion purposes to the interior of the pot; and means forming a mixing chamber for a pilot flame, said means including side walls and a connecting top wall sloping downwardly from a side wall of the pot, said means having an inlet for air and an outlet at the lower end of the top wall thereof, a side wall of the pot being perforated immediately above the upper end of the top wall for admitting air to the pot above the top wall, the vertical wall of said pot immediately about said perforations being bent for deflecting such air entering the pot through said perforations downwardly over the sloping top wall toward the outlet of said chamber for supplying secondary air for combustion at said outlet.

3. As an article of manufacture, a structure forming a low fire fuel and air mixing chamber for use in combination with an oil burning vaporizing pot type burner of the type comprising a chamber having a bottom wall, generally upright side walls perforated to admit air to support combustion and an oil admission opening for delivering oil onto the bottom wall of the chamber; said structure including a top wall and downwardly extending side walls forming an inverted channel open at opposite ends, said side walls of the structure being adapted to rest upon the bottom wall of the pot and in a position so that the top wall of the structure overlies the oil delivered, for pilot purpose, to the bottom wall of the pot, said structure being positioned so that one open end of the channel registers with certain of the perforations in the side walls of the pot and the upright ends of the side walls of last mentioned end of structure are juxtaposed with the upright side walls of the pot, the top wall of the structure converging toward the bottom wall of the pot from the last mentioned end of the pilot structure toward the other open end thereof.

4. A fuel burner comprising, in combination, a combustion pot having bottom and side walls, the latter walls having vertically spaced air-admitting openings, means having a top wall and converging side walls disposed in the lower part of the pot, said means forming a vaporizing chamber having an outlet communicating with the interior of said pot, means for introducing liquid fuel into said chamber, said chamber being in communication with certain of said air-admitting openings in said pot side walls, the axes of said openings being inclined to direct jets of air flowing therethrough in a downward direction.

5. In a pot type burner, a burner pot having a circumferential side wall and a bottom wall, a liquid fuel duct extending to the interior of said pot, the interior of which is in communication with the discharge end of said liquid fuel duct, said pilot housing including inwardly converging side walls and a downwardly and inwardly inclined top wall, the inner edges of said walls defining a relatively restricted discharge opening to the interior of the pot, the side wall of the pot having a plurality of primary air inlet apertures circumferentially spaced thereabout and located at various distances from the bottom of the pot, some of said primary air inlet apertures being in communication with the interior of the pilot housing, the pot having means for admitting secondary air at a level above the top of the pilot housing.

6. A liquid fuel burner comprising, in combination, a combustion pot including a fuel receiving floor and a circumferential side wall, said pot having air inlet openings located at various levels in the wall, means for delivering secondary air to the mixture of primary air and vaporized fuel formed in the pot; means including side walls and a downwardly and inwardly inclined top wall, forming a mixing chamber for supporting combustion of a pilot flame, said chamber having an inlet end for air, in register with a part of said pot side wall and an outlet at the opposite end defined by the inner edges of said side and top walls, said outlet being disposed immediately adjacent the fuel receiving floor of the pot, and means for supplying liquid fuel to said chamber, the air inlet apertures in that part of the pot side wall which is in register with the inlet end of the mixing chamber constituting a source of air supply for the liquid fuel supplied to said chamber.

7. A fuel burner comprising, in combination, a combustion pot having side walls, said walls having air admitting openings; mixing chamber means comprising upwardly extending side walls and a connecting top wall; floor means for the pot and the mixing chamber means, said floor means and mixing chamber means forming a mixing chamber for a pilot flame for fuel delivered to the pot, the walls of said chamber being arranged so that the cross sectional area of the chamber diminishes gradually toward one end, said side walls of the chamber being spaced from one another at said end to form a mixture outlet at said end immediately adjacent the floor means, the opposite end of said chamber having an air inlet opening, said floor means having a substantially horizontal portion and a portion sloping downwardly toward the center of the pot and disposed laterally of the substantially horizontal portion, said substantially horizontal portion being disposed below the top wall of the mixing chamber means and extending substantially throughout the length of the chamber; and means for supplying liquid fuel to the substantially horizontal portion of the floor means.

8. A fuel burner comprising, in combination, a combustion pot having side walls, said walls having air admitting openings; mixing chamber means comprising upwardly extending side walls and a connecting top wall; floor means for the pot and the mixing chamber means, said floor means and mixing chamber means forming a mixing chamber for a pilot flame for fuel delivered to the pot, the top wall of the chamber extending downwardly toward one end, said chamber having a mixture outlet at said end immediately adjacent the floor means, the opposite end of said chamber having an air inlet opening, said floor means having a substantially horizontal portion and a portion sloping downwardly toward the center of the pot, said substantially horizontal portion being disposed below the top wall of the mixing chamber means and extending substantially throughout the length of the chamber; and means for supplying fuel to the substantially horizontal portion of the floor means.

9. A fuel burner comprising, in combination, a combustion pot having side walls, said walls having air admitting openings; mixing chamber means comprising upwardly extending side walls and a connecting top wall; floor means for the pot and the mixing chamber means, said floor means and mixing chamber means forming a mixing chamber for a pilot flame for fuel delivered to the pot, the upwardly extending walls of the chamber tapering toward one another to form a fuel mixture outlet at the narrow end of the chamber immediately adjacent the floor means, said floor means having a substantially horizontal portion and a portion sloping downwardly toward the center of the pot and disposed laterally of the substantially horizontal portion, said substantially horizontal portion being disposed below the top wall of the mixing chamber means and extending substantially throughout the length of the chamber; and means for supplying liquid fuel to the substantially horizontal portion of the floor means.

10. A fuel burner comprising, in combination, a combustion pot having side walls, said walls having air admitting openings; mixing chamber means comprising upwardly extending side walls and a connecting top wall; floor means for the pot and the mixing chamber means, said floor means and mixing chamber means forming a mixing chamber for a pilot flame for fuel delivered to the pot, the side walls of the chamber converging toward one end and the top wall extending downwardly toward said end to form a fuel mixture outlet at said end immediately adjacent the floor means, said floor means having a substantially horizontal portion and a portion sloping downwardly toward the center of the pot, said substantially horizontal portion being disposed below the top wall of the mixing chamber means and extending substantially throughout the length of the chamber; and means for supplying liquid fuel to the substantially horizontal portion of the floor means.

11. A fuel burner comprising, in combination, an open top combustion pot having side walls, said walls having vertically spaced perforations for admitting air for combustion purpose to the interior of the pot; mixing chamber means comprising upwardly extending side walls and a connecting top wall; floor means for the pot and the mixing chamber means, said floor means and mixing chamber means forming a mixing chamber for a pilot flame for fuel delivered to the pot, certain walls of said chamber being arranged so that the cross sectional area of the chamber diminishes gradually toward one end, said side walls of the chamber being spaced from one another at said end to form with said top wall, a mixture outlet at said one end immediately adjacent the floor means, the entire mixture outlet formed by said walls being a substantial distance below the lowermost perforations in the side walls of the pot, some of the perforations in the pot adjacent the chamber opening into the chamber for flow of air thereto; and means for delivering liquid fuel to the chamber.

12. A fuel burner comprising, in combination, an open top combustion pot having side walls, said walls having vertically spaced perforations for admitting air for combustion purpose to the interior of the pot; mixing chamber means comprising upwardly extending side walls and a connecting top wall; floor means for the pot and the mixing chamber means, said floor means and mixing chamber means forming a mixing chamber for a pilot flame for fuel delivered to the pot, said side walls of the chamber being spaced from one another at one end to form a mixture outlet at said end, the opposite end of said chamber having an air inlet opening, said mixing chamber being disposed within the pot and extending inwardly toward the center of the pot, from a side wall thereof, the top wall of the mixing chamber sloping downwardly toward the outlet end and said top wall at said outlet end being concaved, said top wall being constructed so that the height of the outlet is substantially uniform throughout the horizontal length thereof; and means for delivering liquid fuel to the chamber.

NEIL H. CARGILE.
CORNELIUS B. CLEMETSON.
MARCUS L. NELSON.

REFERENCES CITED

The following references are of record in the file of this patent:

UNITED STATES PATENTS

| Number | Name | Date |
|---|---|---|
| 990,150 | Liddell | Apr. 18, 1911 |
| 1,004,040 | Laizure | Sept. 26, 1911 |
| 1,570,003 | Pickering | Jan. 19, 1926 |
| 1,639,744 | Misch | Aug. 23, 1927 |
| 1,806,566 | Sturgis | May 19, 1931 |
| 1,810,035 | Valjean | June 16, 1931 |
| 1,835,297 | Grant | Dec. 8, 1931 |
| 1,975,266 | Gambell | Oct. 2, 1934 |
| 2,020,777 | Gore, et al. | Nov. 12, 1935 |
| 2,083,832 | Daniels | June 9, 1937 |
| 2,162,844 | Jenson | June 20, 1939 |
| 2,207,843 | Wilkes | July 16, 1940 |
| 2,214,670 | Gilmore | Sept. 10, 1940 |
| 2,241,470 | Miller | May 13, 1941 |
| 2,293,697 | Chadwick | Aug. 25, 1942 |
| 2,448,148 | Miller et al. | Aug. 31, 1948 |